No. 691,584. Patented Jan. 21, 1902.
J. BECKER.
AMMUNITION CONVEYER OR RAMMER FOR GUNS.
(Application filed July 18, 1901.)
(No Model.) 7 Sheets—Sheet 2.

No. 691,584. Patented Jan. 21, 1902.
J. BECKER.
AMMUNITION CONVEYER OR RAMMER FOR GUNS.
(Application filed July 18, 1901.)
(No Model.) 7 Sheets—Sheet 3.

Witnesses:
Geo W Essidvaus.
E. P. Hendrickson.

Inventor:
Julius Becker,
by A Faber du Faur.
Attorney.

No. 691,584. Patented Jan. 21, 1902.
J. BECKER.
AMMUNITION CONVEYER OR RAMMER FOR GUNS.
(Application filed July 18, 1901.)
(No Model.) 7 Sheets—Sheet 4.

No. 691,584. Patented Jan. 21, 1902.
J. BECKER.
AMMUNITION CONVEYER OR RAMMER FOR GUNS.
(Application filed July 18, 1901.)
(No Model.) 7 Sheets—Sheet 5.

Fig. 9.

Witnesses:
Geo W Eisenbraun
E. P. Hendrickson

Inventor:
Julius Becker
by A Fisher du Faur
Attorney.

UNITED STATES PATENT OFFICE.

JULIUS BECKER, OF ESSEN, GERMANY, ASSIGNOR TO FRIED. KRUPP, OF ESSEN, GERMANY.

AMMUNITION CONVEYER OR RAMMER FOR GUNS.

SPECIFICATION forming part of Letters Patent No. 691,584, dated January 21, 1902.

Application filed July 18, 1901. Serial No. 68,736. (No model.)

*To all whom it may concern:*

Be it known that I, JULIUS BECKER, a citizen of the German Empire, residing at 17 Heinickestrasse, Essen-on-the-Ruhr, Germany, have invented certain new and useful Improvements in Ammunition Conveyers or Rammers for Guns, of which the following is a specification.

The present invention has reference to ammunition conveyers or rammers actuated by air or liquid pressure and adapted for divided ammunition, its object being to provide a gear by which the charging of the powder-cartouch is effected at a smaller speed and has less stroke than the charging of the projectile. This object is accomplished, essentially, by alternately retarding the outward motion of the rammer by means of a throttling device arranged within one of the conduits leading to the rammer-cylinder and which throttling device is automatically actuated by the movement of the starting-lever, the extent of the outward motion of the rammer being likewise limited by means of a stop automatically thrown in by the movement of the starting-lever.

The nature of the invention will best be understood when described in connection with the accompanying drawings, in which—

Similar letters of reference designate corresponding parts throughout the several views of the drawings.

Figure 2:
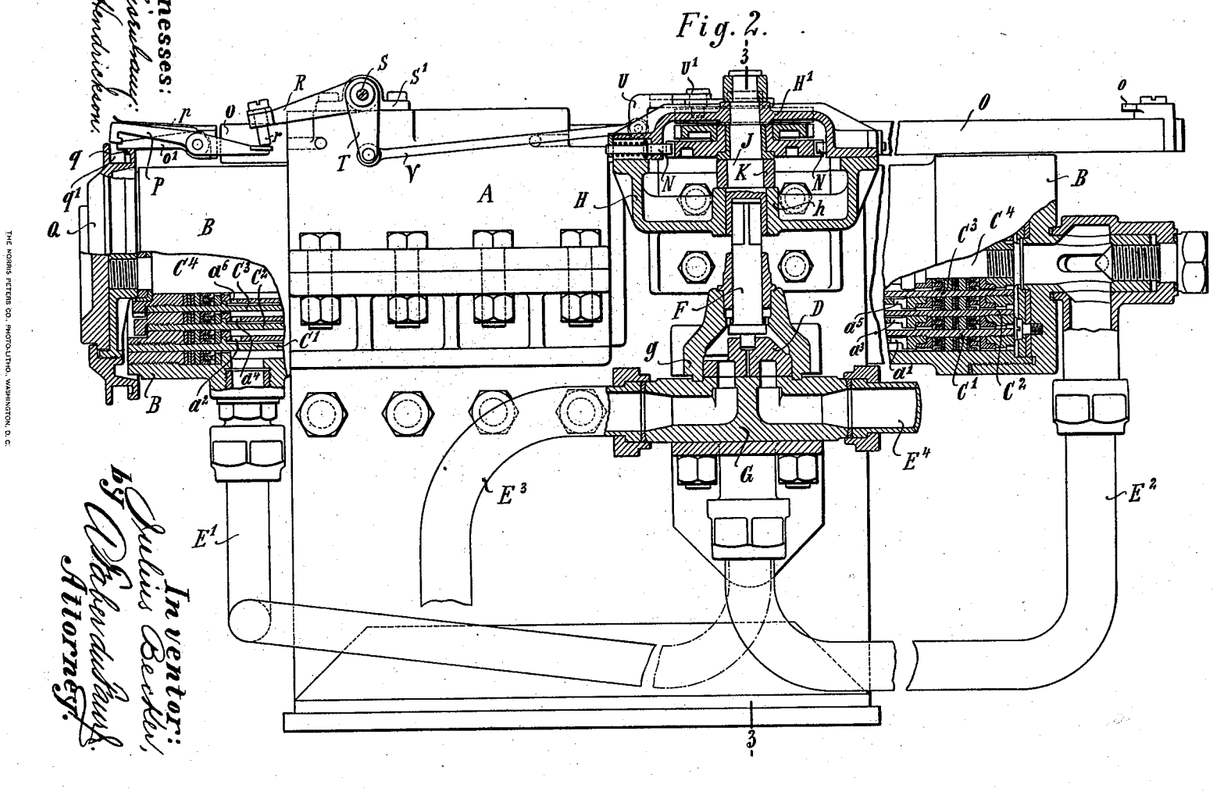
Fig. 2 is a side view of Fig. 1, partly in section.

The construction and mode of operation of the conveyer itself are well known, and it is herein but shortly described with reference to Fig. 2. In this figure the letter A designates the frame, within which is secured the cylinder B, containing several telescopically-arranged pistons $C'$ $C^2$ $C^3$ $C^4$. The pistons $C'$, $C^2$, and $C^3$ form the cylinders, respectively, for the smaller pistons $C^2$, $C^3$, and $C^4$, respectively, which themselves are connected with each other and with the cylinder B by a series of openings $a'$ $a^2$ to $a^6$. The two ends of the cylinder B are connected by conduits $E'$ and $E^2$ with the chest G of the valve D, secured laterally to the frame A, (see also Fig. 3,) the said valve being herein shown as a four-way valve. $E^3$ is a conduit for liquid under pressure leading to the chest G, and $E^4$ is the waste-liquid conduit. The four conduits $E'$, $E^2$, $E^3$, and $E^4$ terminate at the face of the valve in such a manner that the mouths of the conduits $E'$ and $E^2$, as well as those of the conduits $E^3$ and $E^4$, are diametrically opposite, while the former are distant from the latter an angle of ninety degrees. The effective throw of the valve D from the position of rest both ways is therefore forty-five degrees. The rotation of the valve is effected through the spindle F passing through the cover $g$ of the chest G.

By turning the valve D from the position of rest in the direction of the movement of the hands of a watch the conduit $E'$ is connected with the conduit $E^4$ and the conduit $E^2$ with the conduit $E^3$, so that an outward motion of the rammer takes place, while by turning the valve in the opposite direction connections are made between the conduits $E'$ and $E^3$ and between the conduits $E^2$ and $E^4$, whereby the rammer is pushed in.

Figures 1, 7:
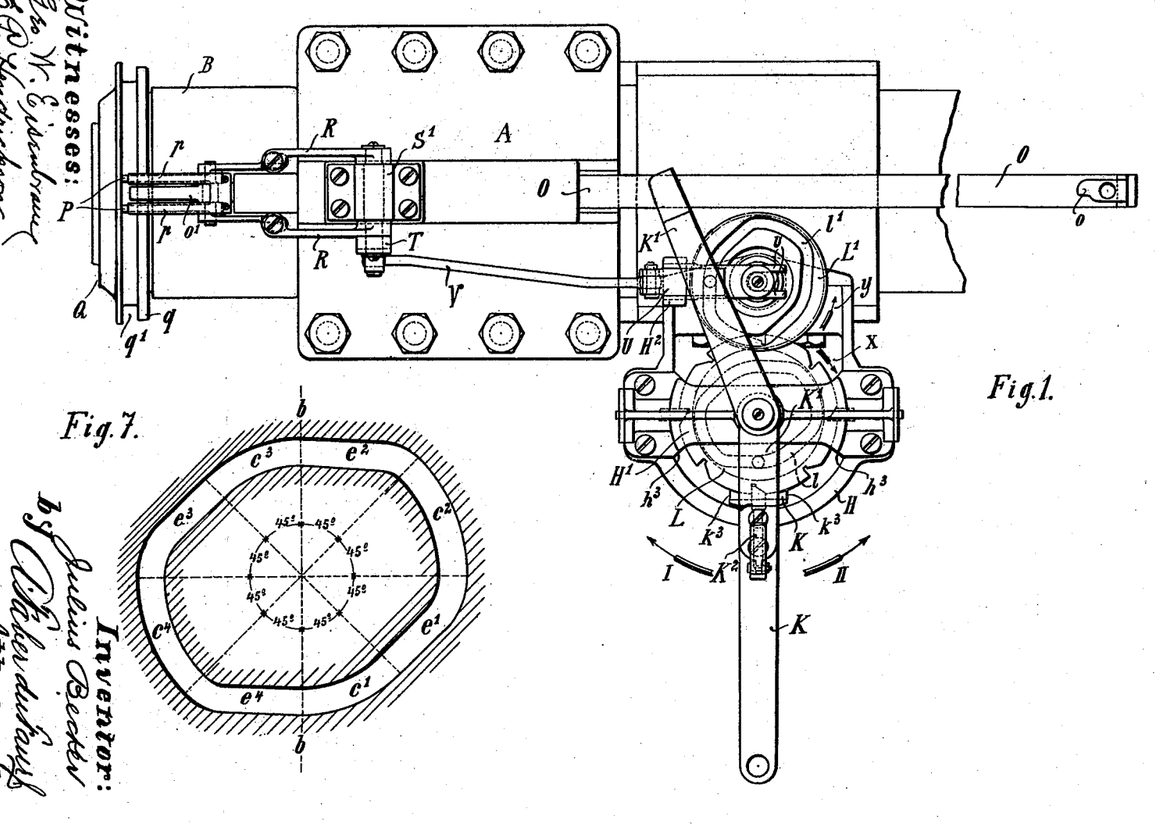
Figure 1 represents a top view of the conveyer with the valve-gear in the position of rest.
Figs. 5 to 7 are detail views, partly on a larger scale.

For the purpose of retarding the velocity of the rammer in charging the cartouch the following means are provided: A throttle-valve $d$ is arranged within a port $G'$, Fig. 3, on the side of the valve-chest G, with which port the conduit $E'$ communicates. The throttle-valve is normally kept open by the pressure within the conduit; but, as will be hereinafter explained, it is adapted to be automatically depressed when the cartouch is pushed in by means of a mechanism which hereinafter will be designated as the "valve-gear." By the depression of the valve $d$ the area of the port G is correspondingly reduced and the liquid is throttled, thus retarding the motion of the rammer. The valve-gear, through which the valve D is turned and the throttle $d$ brought into action, consists, essentially, Figs. 1 and 3, of a starting-lever K, a cam-disk L, which by means of intermediate mechanism is actuated by the starting-lever, and a sliding stop M on the starting-lever, which is moved by means of the cam-disk and sets the throttle-valve. The valve-gear is arranged upon and within a casing H, placed above the valve-chest G and secured concentrically with respect to the same to the frame A. At the bottom of the casing H two eyes are arranged, the one, $h'$, laterally and the other, $h$, centrally. The lateral eye $h'$ is vertically above the spindle $f$ of the throttle-valve $d$ and serves as a straight-line guide for a knob $f'$ on the spindle $f$, which knob $f'$ carries a small friction-roller $f^2$. Within the central eye $h$ a spindle J is arranged and adapted to turn therein. The upper part of this spindle J is guided within the bail-shaped cover H' of the case (see also Fig. 2) and is coupled to the valve-spindle F, so as to prevent turning of the one relative to the other. The crooked starting-lever K is secured upon the spindle J, and the disk L is loosely secured thereon. At its rim the latter is provided with shifting teeth, opposite to which a spring-pawl $k$ is connected to the starting-lever K. When the starting-lever is moved in the direction of arrow I, Fig. 1, this pawl engages the shifting teeth and rotates the disk L in the same direction. On the reverse motion of the lever K in the direction of arrow II the pawl slides over the teeth without moving the disk. Correspondingly to the effective throw of the valve D the starting-lever can be turned forty-five degrees each way from the position of rest, its motion being limited by its edges $k^3 k^3$ striking against the edgs $h^3 h^3$ of the cover H' of the casing. In the following description the motion of the starting-lever in the direction of arrow I will be designated as the "throw to the left" and the reverse motion as the "throw to the right," while the corresponding extreme positions may be designated as "right" and "left" extreme positions. Eight shifting teeth for the starting-lever are provided, so that at each movement the disk L is turned forty-five degrees. An accidental backward movement of the disk is prevented by the engagement with the notches between the shifting teeth of two spring-bolts N, Fig. 2, located within the cover H' of the casing. Upon the lower surface of the disk L a cam-groove $l$ is provided, which in Fig. 7 is shown on a larger scale in a horizontal section through the cam-disk L. This cam-groove is formed of four concentric parts $c'$ $c^2$ $c^3$ $c^4$, placed ninety degrees apart and alternately of large and small diameter, and four eccentric parts $e'$ $e^2$ $e^3$ $e^4$. The eccentric parts of the groove connect each two succeeding concentric parts of unequal radii. The length of each part of the groove corresponds to an angular motion of forty-five degrees and any two sections of the groove on the same diameter are equidistant from the center, so that the groove is bisected into two congruent halves by any diameter. The position of the groove $l$ when the rammer is in the position of rest before conveying the projectile is such that the diameter $b\ b$ between the parts $e^4$ and $c'$ on one side and between $e^2$ and $c^3$ on the other side is in the vertical median plane of the starting-lever, Fig. 1. The sliding stop M (shown in Fig. 6 in top, bottom, and front views on an enlarged scale) is placed upon the crooked part of the starting-lever by two dovetail grooves $m$ of the stop engaging corresponding ledges $k'$ on the lever. On the lower side of the stop, which is situated slightly higher up than the upper rim of the roller $f^2$, Fig. 3, there is a gradually-ascending and then at the same level extending cam-rib $m'$, which coöperates with the roller $f^2$. This rib extends from the starting-lever at the right, has a circular curvature, and is of such a length that when the valve-lever is turned ninety degrees to the left extreme position a vertical plane through the axis of the roller $f^2$ still strikes the rib $m'$. Into a bore of the stop M a pin M' is screwed, which engages the cam-groove $l$ and which in the position of rest of the rammer is in a position exactly at the outer ends of the parts $e^4$ and $c'$ of the groove. When by oscillating the starting-lever $k$ the cam-disk L is shifted, the pin M' during the motion of the starting-lever to the right—i. e., in the direction of arrow II, Fig. 1—and while the cam-disk is at rest passes in succession through the several parts of the groove $l$. While thus passing through the eccentric parts $e'$ or $e^3$, respectively, $e^2$ or $e^4$, the pin M' causes a radial displacement of the stop M outwardly and inwardly. When, however, the pin M' passes through the concentric parts $c'$ $c^2$ $c^3$ $c^4$ of the groove, no displacement of the stop M takes place. The degree of displacement of the stop M—that is, the difference of the radii of the concentric parts of the cam-groove $l$—is such that when the stop M is in its outward position it has the same displacement from the turning axis J as the roller $f^2$. Consequently when in this position of the stop M the starting-lever is turned to the left the roller $f^2$ runs up on the rib $m'$, so as to depress the throttle-valve $d$. When, however, the stop is in its inward position, the roller $f^2$ is beyond the reach of the rib $m'$.

For the purpose of likewise automatically shortening the stroke of the rammer when the motion is retarded the following provisions are made: Within the frame A a telescopic rod O, Figs. 1 and 2, is arranged in guides permitting longitudinal motion, which rod at the proper time can be automatically coupled to the rammer-head Q, so as to share the motion of the rammer-pistons. A tappet provided on the rod strikes against the starting-lever and carries it along, thereby stopping the rammer.

For coupling the rod O to the rammer-head the coupling-latches P are provided, which are pivoted to the forward prolongation $o'$ of the rod. This prolongation $o'$ rests upon the rim $q$ of the rammer-head $Q$, so as to support the rod O when pushed out and to take the load away from the latches P. The latter are constructed as double-armed levers, the front ends being hook-shaped and the rear ends flattened. The forward arms of the latches P, which are under the pressure of the flat springs $p$, have a tendency to fall into the undercut annular groove $p'$ of the rammer-head Q. Normally, however, the angular movement of the latches necessary for this purpose is prevented by means of a setting mechanism, which at the proper times effects the coupling as well as the uncoupling of the running-out rod O and the rammer-head Q.

The setting mechanism consists, essentially, of a cam-disk $L'$, actuated from the starting-lever, a sliding piece U, actuated by this cam-disk, and a system of levers V T S R.

Figures 3, 4, 5, 6:
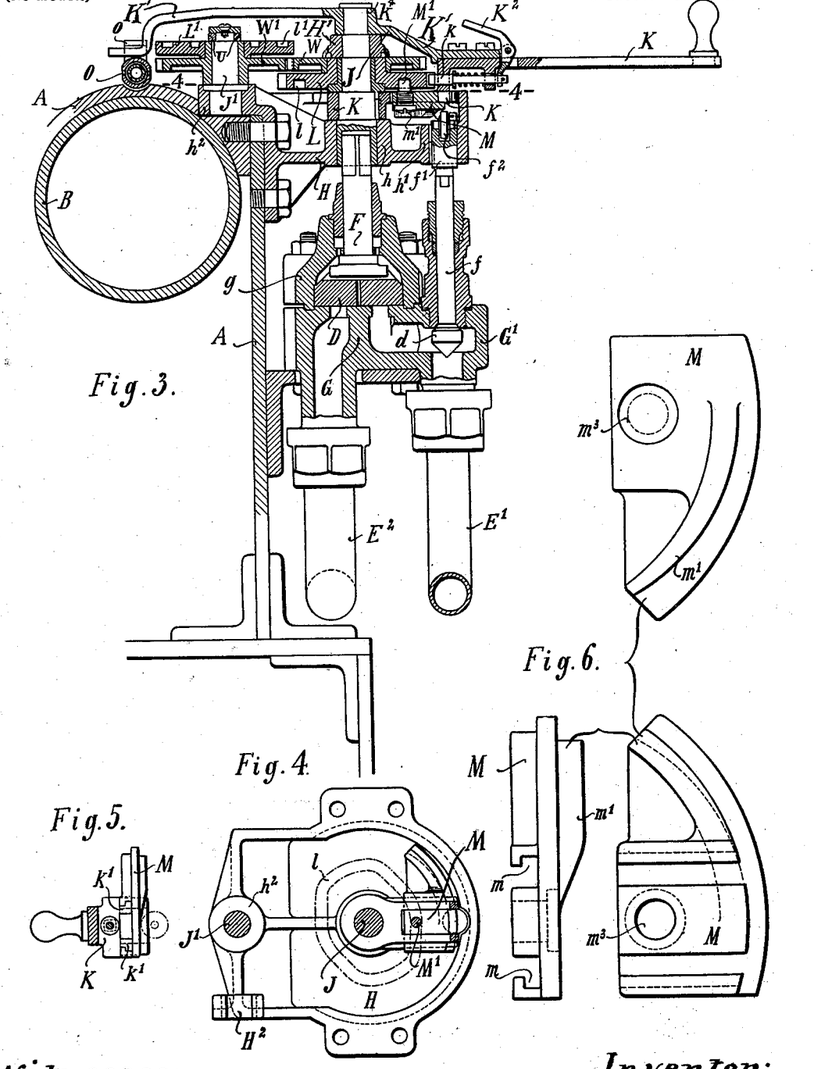
Fig. 3 is a vertical section on the line 3 3, Fig. 2, looking from the left.
Fig. 4 is a horizontal section on the line 4 4, Fig. 3, looking from above.
Figure 8:
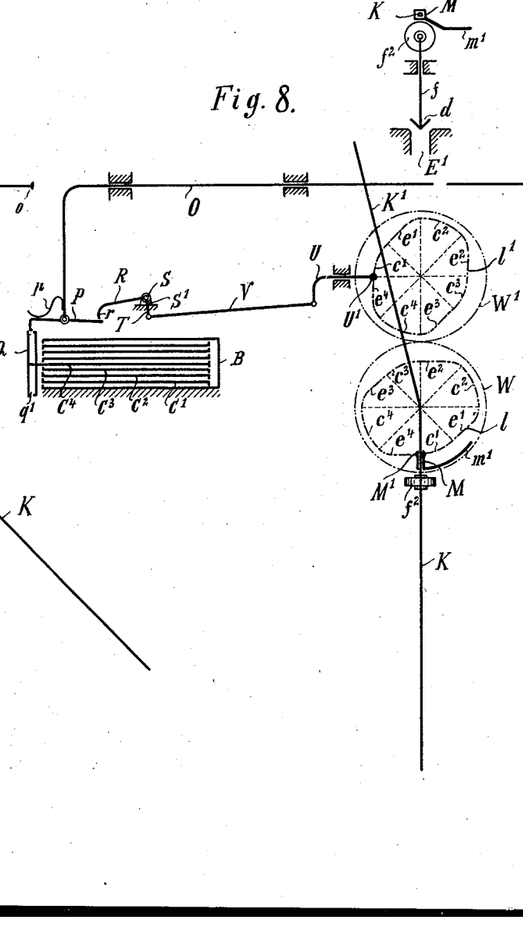
Figs. 8 to 13 are diagrammatic views illustrating the most important successive positions of the principal parts of the conveyer and the valve-gear in charging a projectile and a cartouch.
Figure 9:
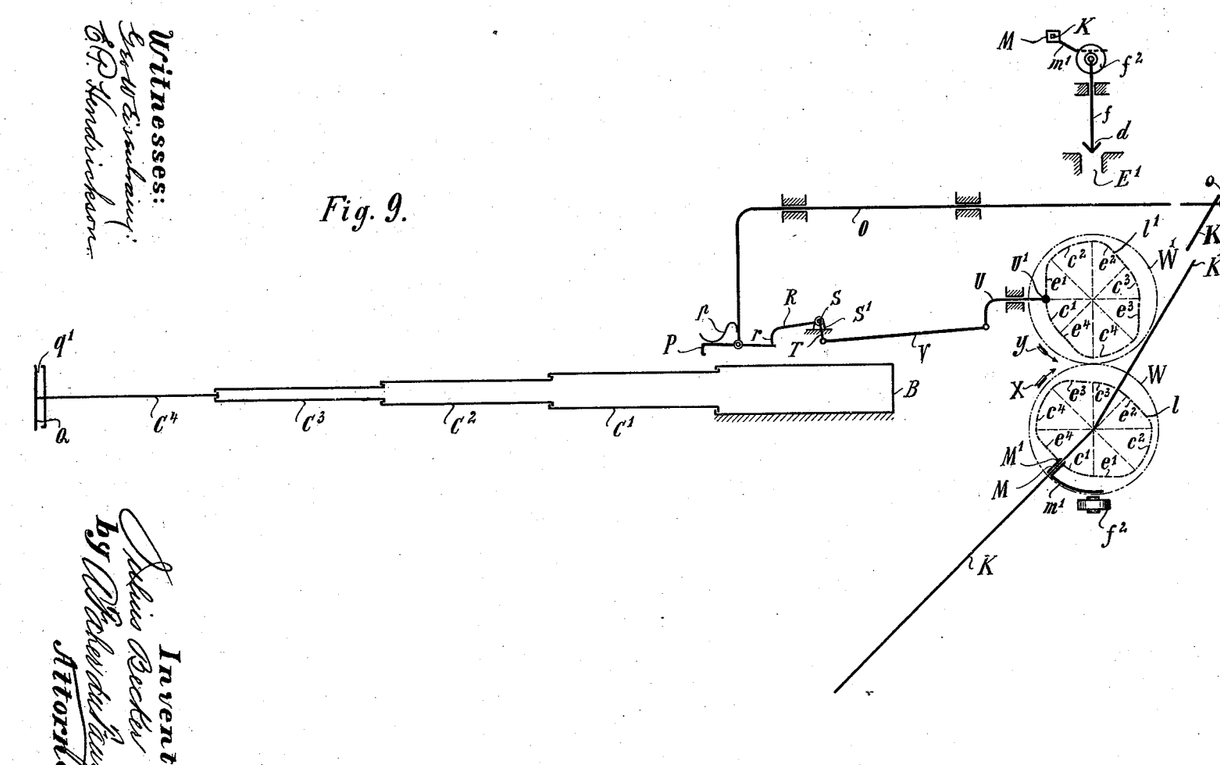

The cam-disk $L'$, Fig. 3, is pivoted on a pin $J'$, secured within an eye $h^2$ of the casing H. A cam-groove $l'$ is sunk into the upper surface of the disk $L'$, which groove is congruent with the cam-groove $l$. (The position of the cam-groove $l'$ will hereinafter be described.) The disk $L'$ is firmly connected to a gear-wheel $W'$, which meshes into another gear-wheel W of equal diameter, which is rigidly connected to the cam-disk L. By this arrangement when the starting-lever K is oscillated the cam-disk $L'$ is turned step by step to the same angle as the cam-disk L, but in opposite direction. The purpose of the cam-disk $L'$ is to move the slide U, Figs. 1 and 2, back and forth by its rotation. This slide is guided in a horizontal direction parallel to the rammer within a bracket $H^2$ of the casing H and engages the upper reduced end of the spindle $J'$ with its forked end $u$ for insuring good guidance. (See also Fig. 3.) Into the slide U a pin $U'$ is screwed, which engages the cam-groove $l'$. The position of the groove $l'$ in relation to the pin $U'$ is such that in the position of rest of the rammer and before conveying the projectile the pin $U'$ is at the dividing-line between the parts $e^4$ and $c'$ and that on turning the cam-disk in the direction of arrow $y$ in Fig. 1 the pin $U'$ passes through the parts $c'$ $e'$ $c^2$ $e^2$, &c., of the groove in succession. A connecting-rod V is pivoted to the slide, and its other end engages an arm T, secured to an arbor S. The latter is mounted in a bearing $S'$ on the frame A and carries two arms R, into the free ends of which set-screws $r$ are screwed, which project downwardly to the flattened rear ends of the coupling-latches P and prevent when in the position of rest shown the engagement of the latches P with the groove $q'$ of the rammer-head. A motion of the slide U to the left causes the arms R to swing upwardly and release the latches, so that under the action of the springs $p$ coupling of the rod O and the rammer-head Q is established.

Now in order to cause the coupling of the rod O with the rammer-head to effect a shortening of the stroke of the outwardly-moving rammer the rod O is provided with a stop $o$ at its rear end. An arm $K'$, secured to the starting-lever K and encompassed by an eye $k^4$ on the spindle J, crosses the path of the stop $o$. The length of the rod O, respectively the distance of the stop $o$ from the arm $K'$, is so taken that when in conveying the cartouche the rod O is drawn along by the rammer the stop $o$ comes into contact with the arm $K'$ of the starting-lever before the rammer has completed its travel, shortened by the desired distance—that is, the length of the cartouche. The stop then carries the starting-lever back to its position of rest, so that the advancing rammer is stopped in the proper position.

Figure 10:
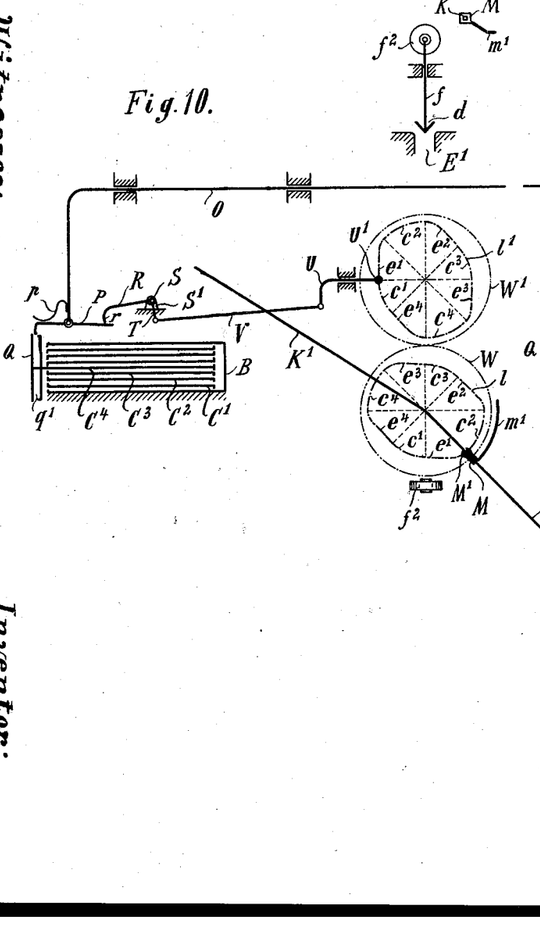
Figure 11:
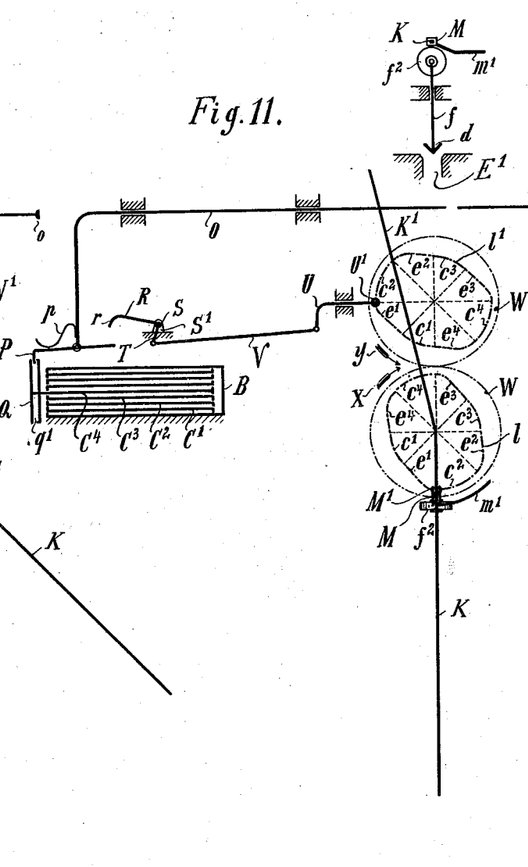
Figure 12:
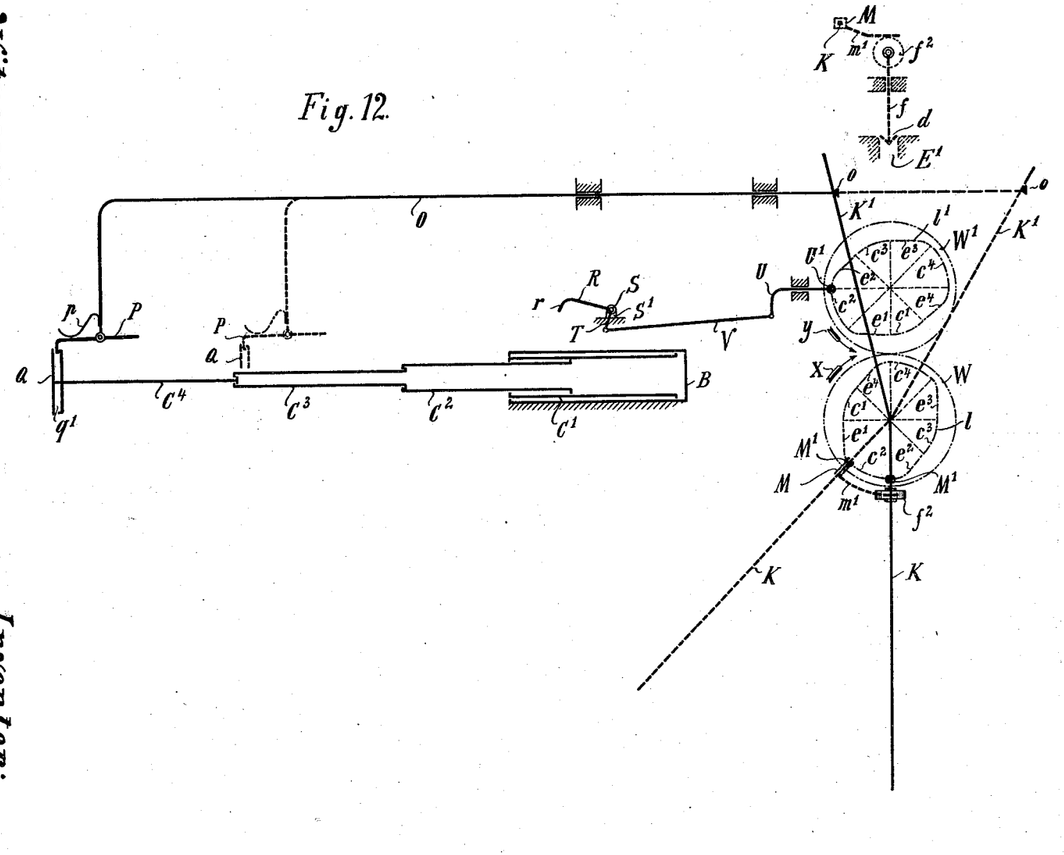
Figure 13:
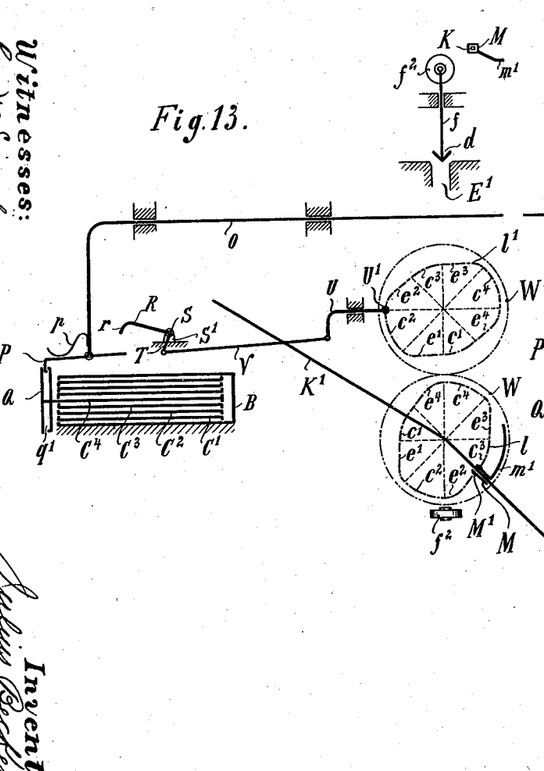

The action of the apparatus will now be explained with reference to the diagrammatic drawings shown in Figs. 8 to 13. Before conveying the projectile the several parts are in the positions shown in Fig. 8. The starting-lever K and the four-way valve (not shown) are in the position of rest. The pin $M'$ of the stop M, sliding on the starting-lever, is on the dividing-line between the parts $e^4$ and $c'$ of the cam-groove $l$. The stop M is pulled in, and the throttle-valve $d$ is open. The pin $U'$ of the slide U is on the dividing-line between the parts $e^4$ and $c'$ of the cam-groove $l'$. The slide U is at its outer limit to the right, and the latches P are held out of engagement with the groove $q'$ of the rammer-head by the levers R. For conveying the projectile the starting-lever K is turned forty-five degrees to the left into the position shown in Fig. 9, so that the liquid under pressure is admitted to the rear end of the cylinder B. This motion of the starting-lever causes turning of both cam-disks in the direction of the arrows $x$ and $y$ to an angle of forty-five degrees, the pin $M'$ meanwhile maintaining its position in relation to the cam-groove $l$, while the pin $U'$ travels through the concentric part $c'$ of the cam-groove $l'$. Thus changes are not effected in the positions of the stop M and of the throttle-valve $d$, as well as in the setting system U V T S R, and the outward movement of the rammer takes place at the full speed and to the end of the stroke. After the projectile has been pushed into place the starting-lever is returned forty-five degrees to the right into its position of rest, the shifting pawl of the starting-lever sliding over the teeth without turning the cam-disks, and the pin $M'$ passes through the concentric part $c'$ of the groove; otherwise no part of the rammer and of the valve-gear changes the positions thereof shown in Fig. 9. Now in order to push back the rammer the starting-lever K is, as shown in Fig. 10, turned from its position of rest through an angle of forty-five degrees to the right, whereby the liquid under pressure is admitted to the front end of the cylinder B. As before, this motion of the starting-lever has no effect upon the position of the setting system U V T S R, since the cam-disks are not turned. A change, however, is made in the position of the stop M, since the pin $M'$ passes through the eccentric part $e'$ of the cam-groove $l$ and pushes the stop M radially outward. As the throttle-valve $d$ is not at this time affected thereby, the return motion of the rammer takes place at full speed. As soon as the rammer has been returned the starting-lever K is again turned through forty-five degrees to the left—that is, back into the position of rest, as shown in Fig. 11. By this movement the cam-grooves are turned through another forty-five degrees. The stop M, which was pushed out by the preceding motion of the lever K, now passes with the front end of its rib $m'$ just above the roller $f^2$, but for the present does not yet press it down. The pin U' at the same time passes through the eccentric part $e'$ of the cam-groove $l'$ and pushes the sliding piece U to the left, so that by means of the system of levers V T S the latches P are released from the arms R and under the action of their springs $p$ are brought into engagement with the groove $q'$ of the rammer-head Q, thereby effecting coupling of the rod O with the rammer-head Q.

The charging of the cartouche is now accomplished as follows: The starting-lever K is turned through forty-five degrees to the left into the position shown in dotted lines in Fig. 12, whereby the liquid under pressure again gains access to the rear side of the piston and the rammer is moved out and now carries the rod O along with it. Although the cam-disks are advanced forty-five degrees by the just-mentioned movement of the starting-lever, the position of the setting-gear U V T S R remains the same as in Fig. 11, since the pin U' travels through the concentric part $c^2$ of the groove. On the other hand, a change is now made in the position of the throttle-valve, since the rib $m'$ runs up on the roller $f^2$ and almost closes the throttle-valve $d$. By this means the waste liquid from the forward side of the piston is considerably throttled and pushing forward of the rammer retarded. Before the cartouche is pushed completely into the barrel at the position of the rammer-head Q indicated in dotted lines the stop $o$ of the rod O meets the arm K' of the starting-lever and carries the latter back into the position of rest, (shown in full lines,) while at the same time the rammer still further advances into the position shown in full lines, thereby completing the charging of the cartouche. During this backward swinging of the starting-lever no turning of the cam-disks is caused. Therefore no change is made in the position of the setting mechanism U V T S R. The pin M' travels through the concentric part $c^2$ of the cam-groove without, however, thereby causing any radial displacement of the stop M. The latter again reaches the same position (for the sake of clearness indicated only by the pin M') which it had occupied before the charging of the cartouche. (See Fig. 11.) The throttle-valve, consequently, is again released and under the pressure of the waste liquid returns into the open position. The rammer must now be moved back, for which purpose the starting-lever is turned through forty-five degrees to the right into the position shown in Fig. 13. The liquid under pressure again acts against the foward side of the piston and pushes the rammer back at full speed, carrying along the rod O. A change of the position of the valve-gear is effected only in so far as the pin M', traveling through the eccentric part $e^2$ of the cam-groove, again pushes the stop M radially inward. After the completion of the return movement of the rammer the starting-lever is again returned from the position Fig. 13 to the position of rest and shifts the cam-disk forty-five degrees farther. During this movement the pin M', and therefore the slide M, retain their positions in relation to the curve $l$, while the pin U' travels through the eccentric part $e^2$ of the cam-groove and pushes the slide U back into the extreme position to the right. This causes the arms R to swing downward again, thereby releasing the latches P from the groove $q'$, so that the rod O becomes uncoupled. The several parts of the valve-gear now assume exactly the same positions as before charging the projectile, Fig. 8, taking into consideration that the cam-line $c^3 e^3 c^4 e^4$, which now takes the position formerly occupied by the cam-line $c' e' c^2 e^2$, is identical with the latter. For this reason the operation at the subsequent charging of projectile and cartouche will be repeated.

To be enabled to repeat a certain operation without following the order determined by the automatic gear, the following arrangement is provided: Within a slot of the starting-lever K, Fig. 3, is pivoted a small bell-crank lever $K^2$, one arm of which engages the pawl $k$, while the other arm projects above the upper surface of the lever K. By depressing this latter arm the pawl $k$ is withdrawn, so that when the starting-lever is turned it does not come into engagement with the shifting teeth of the cam-disk L. To explain the mode of action of this arrangement more clearly, let it be assumed, for instance, that in charging the cartouche, Fig. 12, some obstacle is met with, making it necessary for the purpose of removing such obstacle to first return the rammer into the original extreme position to the right, Fig. 13, by turning the starting-lever. If then it should be attempted to complete the previously-interrupted charging of the cartouche, if the bell-crank lever were not provided the turning of the starting-lever into the left extreme position would cause the full stroke and the full speed of the rammer, which, however, must be avoided in charging the cartouche. Now for repeatedly obtaining the shortened stroke and reduced speed of the rammer it is simply necessary before turning the starting-lever K from the position Fig. 13 into the extreme position to the left to release the pawl $k$ by pressure upon the bell-crank lever $K^2$, whereupon during the motion of the starting-lever both cam-disks retain their positions, the coupling of the rod O and the rammer-head Q is maintained, so that the stroke of the rammer is shortened, while, on the other hand, the stop M, whose pin M' travels through the parts $e^2$ and $c^2$ of the cam-groove, again depresses the throttle-valve, so as to retard the motion of the rammer. If, then, after charging the cartouche the starting-lever and the rammer are again returned to the position shown in Fig. 13 and the pawl $k$ allowed to fall in, the rammer is again ready for doing its work in the regular succession.

Without deviating from the scope of the present invention the details of the valve-gear may be varied. For instance, the automatic shortening of the stroke of the rammer may be effected by striking of the rod O against a fixed stop for preventing further motion of the rammer instead of striking against the arm K'. The stroke of the rammer in charging the cartouche could also be limited by means of a stop advanced into the path of the rammer-head or the like by the setting system. To be sure, all these modifications would cause heavy strains, because the rammer-pistons would remain under pressure. It is also readily seen that the valve-gear with insignificant alterations could be readily applied to apparatus operated by compressed air.

What is claimed as new is—

1. In an ammunition conveyer or rammer operated by fluid-pressure, the combination of a rammer, a throttling-valve incorporated in one of the conduits leading to the rammer-cylinder, an operating mechanism in connection with said valve adapted to actuate the latter for alternately retarding the stroke of the rammer, and a stop automatically thrown into action by said mechanism for limiting the length of outward movement of the rammer on alternate strokes, whereby the charging of the cartouche is effected at less velocity and shorter stroke than that of the projectile, substantially as described.

2. In an ammunition conveyer or rammer operated by fluid-pressure, the combination of a rammer, a throttling-valve incorporated in one of the conduits leading to the rammer-cylinder, and an operating mechanism for said valve comprising a cam-disk, a ratchet-movement in operative connection with said cam-disk, a starting-lever adapted to turn the cam-disk through the medium of the ratchet-movement, and a sliding stop on the starting-lever adapted to be displaced by the cam-disk during one stroke of the starting-lever, so that on the subsequent stroke the stop engages and partially closes the throttle-valve so as to cause a retardation of the movement of said rammer, substantially as described.

3. In an ammunition conveyer or rammer operated by fluid-pressure, the combination of a rammer, a throttling-valve incorporated in one of the conduits leading to the rammer-cylinder, and an operating mechanism for said valve comprising a cam-disk, a ratchet-movement in operative connection with said cam-disk, a starting-lever adapted to turn the cam-disk through the medium of the ratchet-movement, a sliding rod with limited stroke and adapted to be coupled with the rammer-head and means for automatically coupling said rod with the rammer-head so that the rod prevents complete outward movement of the rammer, substantially as described.

4. In an ammunition conveyer or rammer operated by fluid-pressure the combination of a rammer, a throttling-valve incorporated in one of the conduits leading to the rammer-cylinder, and an operating mechanism for said valve comprising a cam-disk, a ratchet-movement in operative connection with said cam-disk, a starting-lever adapted to turn the cam-disk through the medium of the ratchet-movement, a sliding rod with limited stroke and adapted to be coupled with the rammer-head, a second cam-disk and means for positively turning the second disk by the first disk, a lever system adapted to be displaced by the second cam-disk and to act upon the coupling device of the sliding rod, so that, the second disk having been turned through a certain angle, said rod is coupled with the rammer-head and prevents complete outward movement of the rammer, substantially as described.

5. In an ammunition conveyer or rammer operated by fluid-pressure, the combination of a rammer, a throttling-valve incorporated in one of the conduits leading to the rammer-cylinder, an operating mechanism in connection with said valve adapted to actuate the latter for alternately retarding the stroke of the rammer, and a running-out rod provided with a stop adapted, when the rod is engaged by the rammer-head, to contact with the starting-lever for returning the same to its normal position and thereby prevent further outward movement of the rammer, substantially as described.

6. In an ammunition conveyer or rammer operated by fluid-pressure, the combination of a rammer, a throttling-valve incorporated in one of the conduits leading to the rammer-cylinder, an operating mechanism in connection with said valve adapted to actuate the latter for alternately retarding the stroke of the rammer; and a starting-lever; said operating mechanism comprising a ratchet-movement adapted to be thrown out of action at will for the purpose of repeating either movement of the rammer, substantially as described.

In testimony whereof I have hereunto set my hand in the presence of two subscribing witnesses.

JULIUS BECKER.

Witnesses:
WM. ESSENWEIN,
PETER LIEBER.